(12) United States Patent
Zimmermann et al.

(10) Patent No.: US 9,545,906 B2
(45) Date of Patent: Jan. 17, 2017

(54) METHOD FOR CONTROLLING A BRAKE SYSTEM, BRAKE SYSTEM, AND USE

(71) Applicant: Continental Teves AG & Co. oHG, Frankfurt (DE)

(72) Inventors: Tim Zimmermann, Glashütten (DE); Thomas Bauer, Frankfurt (DE); Dieter Maus, Hohenhameln (DE)

(73) Assignee: Continental Teves AG & Co. oHG (DE)

( * ) Notice: Subject to any disclaimer, the term of this patent is extended or adjusted under 35 U.S.C. 154(b) by 34 days.

(21) Appl. No.: 14/378,758

(22) PCT Filed: Feb. 7, 2013

(86) PCT No.: PCT/EP2013/052477
§ 371 (c)(1),
(2) Date: Aug. 14, 2014

(87) PCT Pub. No.: WO2013/120766
PCT Pub. Date: Aug. 22, 2013

(65) Prior Publication Data
US 2015/0042151 A1 Feb. 12, 2015

(30) Foreign Application Priority Data
Feb. 17, 2012 (DE) .......... 10 2012 202 467

(51) Int. Cl.
*B60T 7/12* (2006.01)
*B60T 13/74* (2006.01)
(Continued)

(52) U.S. Cl.
CPC ............... *B60T 13/745* (2013.01); *B60T 7/22* (2013.01); *B60T 8/1755* (2013.01); *B60T 8/3275* (2013.01); *B60T 8/4059* (2013.01)

(58) Field of Classification Search
CPC ........... B60T 7/22; B60T 13/745; B60T 11/10; B60T 8/172; B60T 8/245; B60R 16/03
See application file for complete search history.

(56) References Cited

U.S. PATENT DOCUMENTS 5,671,982 A 9/1997 Wanke
6,164,735 A * 12/2000 Aizawa .................. B60T 7/042
303/155

(Continued)

FOREIGN PATENT DOCUMENTS

DE 19622754 12/1997
DE 19917904 11/2000
(Continued)

OTHER PUBLICATIONS

International Search Report for PCT/EP2013/052477 mailed May 7, 2013.

(Continued)

*Primary Examiner* — Christopher Schwartz
(74) *Attorney, Agent, or Firm* — RatnerPrestia

(57) ABSTRACT

The invention relates to a method, wherein an electrically operated actuator of a vehicle brake system is controlled in accordance with a braking demand of a vehicle control system, such as occurs in electronic stability control. According to the invention, a supply voltage of the vehicle electrical system applied to the electrically operated actuator is increased if at least one specified condition is met. Thus, the pressure build-up by a hydraulic pump can e.g. be accelerated during emergency braking.

19 Claims, 3 Drawing Sheets

(51) Int. Cl.
*B60T 8/1755* (2006.01)
*B60T 8/32* (2006.01)
*B60T 8/40* (2006.01)
*B60T 7/22* (2006.01)

(56) References Cited

U.S. PATENT DOCUMENTS

| | | | | |
|---|---|---|---|---|
| 6,325,469 | B1* | 12/2001 | Carson | B60T 8/1755 303/140 |
| 6,499,813 | B1 | 12/2002 | Wandel | |
| 6,913,326 | B1* | 7/2005 | Ohkubo | B60T 7/122 303/11 |
| 8,764,127 | B2 | 7/2014 | Leibfried | |
| 2006/0066270 | A1 | 3/2006 | Kumagai | |
| 2007/0282510 | A1* | 12/2007 | Nimmo | B60T 8/243 701/70 |
| 2011/0168502 | A1* | 7/2011 | Linhoff | B60T 13/588 188/72.2 |
| 2011/0254361 | A1 | 10/2011 | Scharmann | |
| 2012/0031692 | A1* | 2/2012 | Koike | B60K 6/48 180/65.25 |
| 2012/0279814 | A1 | 11/2012 | Liebfried | |
| 2012/0319462 | A1* | 12/2012 | Akita | B60T 8/4081 303/2 |
| 2012/0326676 | A1* | 12/2012 | Ahnfalk | B60R 16/03 322/17 |

FOREIGN PATENT DOCUMENTS

| | | | | |
|---|---|---|---|---|
| DE | 102005035770 | | 4/2006 | |
| DE | 102006038675 | * | 3/2008 | B60R 16/03 |
| DE | 102008041498 | | 3/2010 | |
| DE | 102009038805 | | 3/2010 | |
| DE | 102009046339 | | 5/2011 | |
| EP | 0792229 | | 9/1997 | |
| EP | 0982207 | | 3/2000 | |
| WO | 2011054668 | | 5/2011 | |

OTHER PUBLICATIONS

German Search Report mailed Apr. 18, 2013 in counterpart German Application No. 10 2012 202 467.0.

* cited by examiner

METHOD FOR CONTROLLING A BRAKE SYSTEM, BRAKE SYSTEM, AND USE

CROSS REFERENCE TO RELATED APPLICATIONS

This application is the U.S. National Phase Application of PCT/EP2013052477, filed Feb. 7, 2013, which claims priority to German Patent Application 10 2012 202 467.0, filed Feb. 17, 2012, the contents of such application being incorporated by reference herein.

FIELD OF THE INVENTION

The invention relates to a method in which at least one electrically operated actuator of a vehicle brake system is driven in accordance with a braking request made by a vehicle control system, as a result of which braking torque is built up at one or more vehicle wheels independently of the driver, to a brake system for a vehicle comprising at least one electrically operated actuator which allows braking torque to be built up at one or more vehicle wheels independently of the driver, and to the use of said brake system.

BACKGROUND OF THE INVENTION

Modern vehicles are generally equipped with electronically controlled brake systems which provide functions such as brake slip control (ABS, anti-lock brake system), which prevents the wheels from locking during a braking operation, and driving dynamics control (ESC, electronic stability control) which is described, for example, in EP 0792 229 B1, which his incorporated by reference. If an unstable driving situation is identified, active braking intervention is performed, wherein the driving dynamics control means requests that braking torque be built up at one or more wheels independently of the driver and be implemented by the brake system, this stabilizing the vehicle by virtue of a deliberately introduced yaw moment.

Furthermore, motor vehicles increasingly have environment sensors with which other traffic and stationary obstacles can be detected and the positions and/or speeds of said traffic and obstacles in relation to the vehicle which is fitted with the environment sensor can be determined. Networking this environment sensor system with an electronically controlled brake system allows distance control with respect to the motor vehicle traveling in front (ACC, adaptive cruise control), emission of a warning to the driver in the event of particularly critical situations occurring, and automatic initiation of emergency braking when there is a threat of collision. In order to avoid faulty interventions, such an emergency brake assistant (EBA) must only intervene at a late stage, that is to say at the shortest possible distance from the obstacle.

When a braking request is made on account of a safety-critical driving situation, the electronic brake system has to implement said braking request as quickly as possible by building up braking torque. In the case of hydraulic brake systems, this can be achieved in that a pump builds up pressure in one or more wheel brake cylinders.

DE 199 17 904 C2, which is incorporated by reference, discloses a method for driving a pump for supplying auxiliary pressure to a vehicle brake system, in which method full power is supplied to the pump in a first phase, and said pump is operated in a cyclical mode or in a pulsed manner in a second phase. When a condition for identifying an existing increased loading is met, the cyclical mode is suppressed for a prespecifiable time, that is to say full power is supplied to the pump.

DE 10 2009 038 805 A1, which is incorporated by reference, discloses an electronic motor vehicle control device having a boost converter (DCDC converter). When a function request with a high power demand is made, the DCDC converter is switched to an active operating state in which the supply voltage for the driven load is increased in relation to the on-board voltage. Therefore, the functioning of the actuator can be ensured even at a relatively low on-board electrical system voltage. The motor vehicle control device is more costly to manufacture owing to the additional components required.

SUMMARY OF THE INVENTION

An aspect of the present invention allows braking torque to be built up quickly at as low a cost as possible.

Therefore, a method is provided in which at least one electrically operated actuator of a vehicle brake system is driven in accordance with a braking request made by a vehicle control system, as a result of which braking torque is built up at one or more vehicle wheels independently of the driver. According to the invention, a supply voltage of the on-board vehicle electrical system is raised, said supply voltage being applied to the electrically operated actuator/actuators when at least one prespecified condition is met.

The process of checking conditions can be implemented in a customary control device, which has at least one microprocessor, with a low level of expenditure on software and without changing the hardware.

In contrast to the prior art, not only is the basic function of an actuator further ensured but the rate at which braking torque is built up is also increased. A hydraulically unchanged brake system therefore has increased pressure build-up dynamics in relation to the prior art. Therefore, the level of driving safety is increased.

As an alternative, the pump of a hydraulic brake system could be reduced in size in comparison to a conventional brake system given unchanged pressure build-up dynamics, as a result of which it is possible to make a cost saving at the same level of driving safety.

A first prespecified condition is preferably met when a braking request is made by a safety-critical vehicle control system, in particular a driving dynamics control means or an emergency brake assistant. In many cases, arbitration of the braking requests by various vehicle control systems already takes place in electronically controlled brake systems. In this case, a hierarchy of the vehicle control systems is expediently defined, the request made by an emergency brake assistant, for example, being implemented in accordance with said hierarchy, independently of which of the further vehicle control systems are likewise active. Driving dynamics control is also critical for driving safety and could therefore be prioritized over all vehicle control systems, with the exception of the emergency brake assistant. In this case, vehicle control systems are not only to be understood to mean control means in the actual sense, but rather said term is also intended to comprise vehicle assistance functions which request braking intervention independently of the driver (such as a hill-climb assistant for example). Prioritization of safety-critical vehicle control functions of this kind or a prespecified hierarchy is simple to implement in a control device and quick to check.

A second prespecified condition is expediently met when a variable which identifies the vehicle instability, in particular a deviation between a measured actual yaw rate of the vehicle and a setpoint yaw rate which is calculated on the basis of a vehicle model, exceeds a prespecified yaw rate difference threshold value. Since modern vehicles are often equipped with a yaw moment control means, a yaw rate sensor is available without additional costs. The yaw rate difference between the setpoint yaw rate and the actual yaw rate provides a suitable measure for the drive stability. If a threshold value which is lower than the intervention threshold of a yaw moment control means is selected, the supply voltage can be raised in good time; therefore, the optimum dynamics for building up pressure or braking torque is already available when a yaw moment control means is activated.

A third prespecified condition is preferably met when the braking request exceeds a prespecified request threshold value, wherein, in particular, the pressure request made by a vehicle control system or the pressure in a brake circuit of the brake system is considered to be a measure of the braking request. In non-critical driving situations, it is assumed that a driver and also a non-safety-critical vehicle control system request a small build-up of braking torque since this is associated only with a low level of loss of driving comfort.

It is advantageous when the supply voltage of the on-board electrical system is raised above a voltage request in a management unit for the on-board electrical system. A management unit for the on-board electrical system can be implemented in this case as an independent control device or as an extension to another control device, such as an engine control device for example. On account of a management unit which is present in any case being used, the method according to the invention can be implemented without costly changes having to be made to the brake system.

The supply voltage of the on-board vehicle electrical system is preferably raised to a prespecified value or a value which lies in a prespecified interval.

The prespecified value or the prespecified interval is particularly preferably selected depending on which condition/conditions or how many of several prespecified conditions is/are met. Since the supply voltage is raised in line with the level of danger of the driving situation, a suitable compromise between energy consumption and dynamics of the build-up of braking torque can always be selected.

According to a preferred embodiment of the invention, the supply voltage of the on-board vehicle electrical system is raised to the maximum permissible value. Therefore, the optimum dynamics of the build-up of braking torque is ensured.

It is advantageous when the supply voltage is reset to the original value again as soon as none of the prespecified conditions are met any longer or a stationary state of the vehicle is identified. In this case, the original voltage is to be understood to mean a voltage in an interval which is suitable for operation of the vehicle from an energetic and functional point of view and, in particular, the voltage which prevailed before one of the prespecified conditions was met.

It is particularly advantageous when the supply voltage is reset to the original value again only after no braking request has been made by a vehicle control system for a prespecified period of time.

An aspect of the invention further relates to a brake system for a vehicle, comprising at least one electrically operated actuator which allows braking torque to be built up at one or more vehicle wheels independently of the driver. According to the invention, the brake system has a control device which drives at least one electrically operated actuator using a method in which at least one electrically operated actuator of a vehicle brake system is driven in accordance with a braking request made by a vehicle control system, as a result of which braking torque is built up at one or more vehicle wheels independently of the driver wherein a supply voltage of an on-board vehicle electrical system is raised, said supply voltage being applied to the electrically operated actuator/actuators when at least one prespecified condition is met, and which is connected to a management unit for the on-board electrical system via a vehicle data bus or one or more control lines.

According to a preferred embodiment of the invention, at least one of the electrically operated actuators is a pressure medium pump, in particular a piston pump.

According to a further preferred embodiment of the invention, at least one of the electrically operated actuators is an electromechanically operated friction brake. In this case, the wheels of one axle can also be equipped with a hydraulic brake system, while a second axle is provided with electromechanical friction brakes.

The control device is expediently connected to one or more environment sensors and/or a monitoring computer, for evaluating environment sensor systems, by means of a vehicle data bus or one or more control lines.

The invention also relates to the use of a brake system according to the invention in a motor vehicle which is driven by an internal combustion engine and/or at least one electric motor.

BRIEF DESCRIPTION OF THE DRAWINGS

Further preferred embodiments can be found in the dependent claims and the following description of an exemplary embodiment with reference to figures, in which

DETAILED DESCRIPTION OF THE PREFERRED EMBODIMENTS

Figure 1:
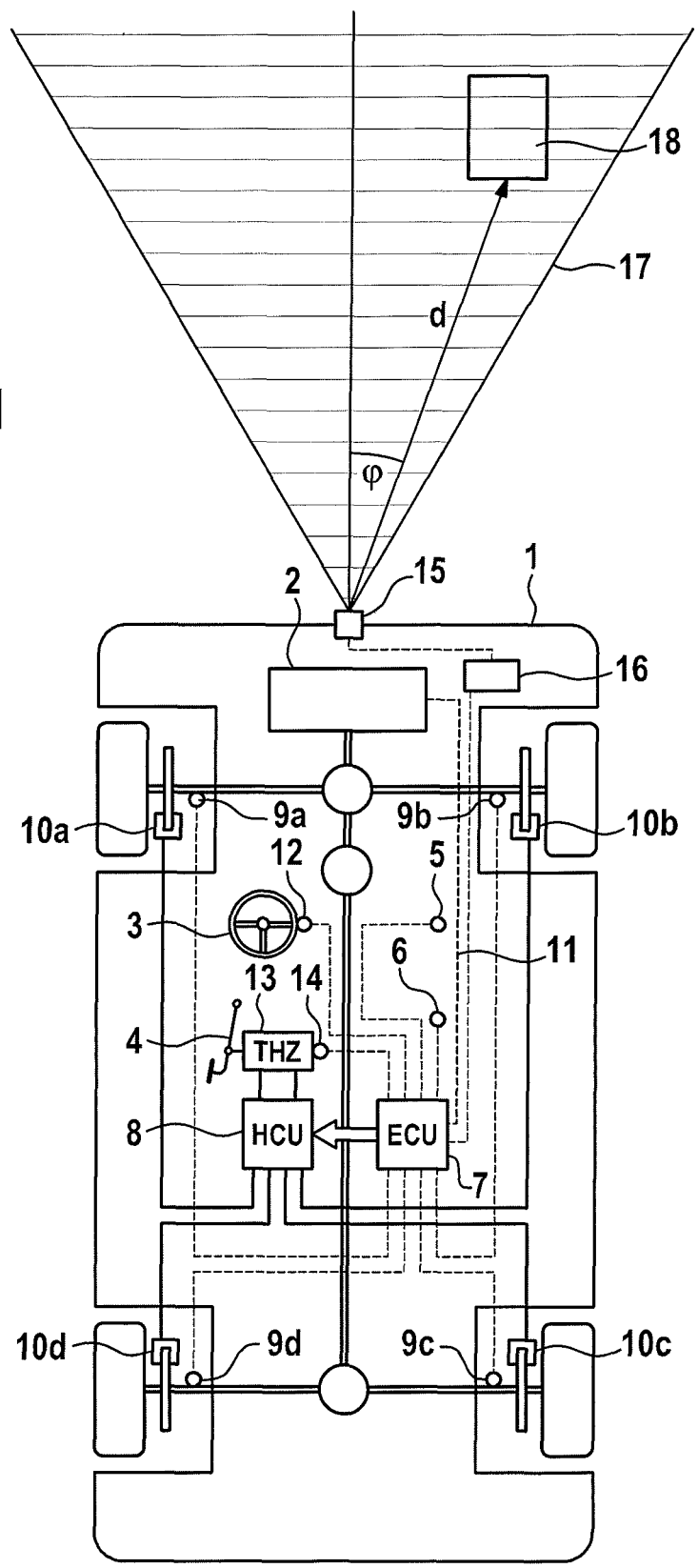
FIG. 1 shows an exemplary motor vehicle.

FIG. 1 shows a schematic illustration of a motor vehicle 1 which is suitable for carrying out the method according to the invention. Said motor vehicle has a drive motor 2 which drives at least some of the wheels of the vehicle, a steering wheel 3, a brake pedal 4 which is connected to a tandem master cylinder (THZ) 13, and four wheel brakes 10a-10d which can be driven individually. The method according to the invention can also be carried out when only some of the vehicle wheels are driven. When the vehicle has a hydraulic brake system, in each case two wheel brakes with corresponding hydraulic lines are combined to form a brake circuit. In addition or as an alternative to hydraulic friction brakes, electromechanically operated friction brakes can also be used as wheel brakes on one, several or all of the wheels. Since the rotation speed which can be achieved and/or the torque which can be achieved of an electric motor depend/depends on the supply voltage, the method according to the invention can also be used for electromechanically operated friction brakes. The following description proceeds, by way of example, from a hydraulic brake system.

A steering wheel angle sensor 12 for measuring the steering angle δ, four wheel rotation speed sensors 9a-9d for measuring the rotation speeds $v_i$ of the individual wheels, a lateral acceleration sensor 5 for measuring the lateral acceleration $a_{Lat}$, a yaw rate sensor 6 for measuring the yaw angle speed $\dot{\Psi}$, also referred to as the yaw rate, and at least one pressure sensor 14 for measuring the brake pressure p which is generated by the brake pedal and the tandem master cylinder THZ are provided for detecting driving dynamics states. In this case, the pressure sensor 14 can also be replaced by a pedal travel sensor or pedal force sensor if the relationship between the pedal position and the braking torque is constant or known. A pedal travel sensor can also be used when the wheels of one or more axles can be connected at least temporarily to a generator in order to allow electrical energy to be recovered during braking. The signals from the wheel sensors are fed to an electronic control device (ECU) 7 which ascertains the vehicle speed $v_{Ref}$ from the wheel rotation speeds $v_i$ on the basis of prespecified criteria.

The ECU 7 receives the information from the sensors described above as well as that from further sensors which may be present and controls the hydraulic unit (HCU) 8 in order to allow the brake pressure to be built up or modulated at the individual wheel brakes independently of the driver. The hydraulic unit comprises a pump for each brake circuit and a plurality of solenoid valves, wherein, in particular, each wheel brake has an inlet valve and an outlet valve. Solenoid valves are expediently provided for the deliberate disconnection of the master cylinder from the wheel brakes and connection of the master cylinder to the intake end of the pump, and a low-pressure storage means is also preferably provided. This allows braking torque to be built up independently of the driver when the pump is activated. The brake system preferably has a pressure cylinder at at least one wheel brake, particularly preferably at each wheel brake of each brake circuit. The drive torque which is currently generated by the drive motor 2 and the drive torque which is desired by the driver are additionally determined. These may also be indirectly ascertained variables which are derived, for example, from an engine characteristic diagram and transmitted to the ECU 7 via an interface 11, for example a CAN bus or FlexRay bus, from the engine control device, not shown.

The driving behavior of the motor vehicle 1 is influenced significantly by the chassis configuration, wherein the wheel load distribution, the elasticity of the wheel suspension means and tire properties, amongst other things, determine the steering behavior of the vehicle in question. In certain driving situations, which are characterized by a prespecified, desired bend radius and the coefficients of friction between tires and the carriageway, there may be a loss of driving stability, wherein the steering behavior which is desired by the driver cannot be achieved. With the existing sensors, the driver's request can be identified and the implementation by means of the vehicle can be checked. The tendency toward a loss of stability is already preferably detected.

The ECU 7 frequently carries out a plurality of methods for controlling the driving stability, wherein arbitration of, under certain circumstances, simultaneously received braking requests takes place. For example, yaw rate control which compares the measured actual yaw rate with a model yaw rate frequently takes place. If this difference is above the control entry threshold, the braking intervention begins. The model yaw rate corresponds to the setpoint yaw rate and is formed by a simple vehicle model relating to the steering angle and the vehicle speed. In addition, the side-slip angle speed is frequently controlled. This variable is also formed by means of the vehicle model and corresponds in oversteering situations to the speed at which the vehicle turns in or the rear of the vehicle swings out. The braking intervention begins as soon as a certain threshold for the side-slip angle speed is exceeded. A brake slip control means which prevents the wheels from locking during a braking process is most widespread.

Furthermore, the vehicle 1 has an environment sensor system with at least one environment sensor 15 with which objects in the environment of the vehicle can be detected, said objects being, in particular, further motor vehicles which are moving in the same lane or in an adjacent lane to the side of and/or in front of the vehicle 1. However, the objects may also be stationary or virtually stationary objects such as, for example, trees, pedestrians or carriageway boundary installations. An environment sensor 15 with a detection range 17 which covers a spatial angle in front of the vehicle 1 and in which an object 18 is illustrated is shown by way of example. The signals from the environment sensor 15 are evaluated by a monitoring computer 16 and corresponding information is made available to the ECU 7. However, the monitoring computer 16 can, in principle, also be integrated into the environment sensor 15, and/or the ECU 7 can directly process the sensor signals.

The environment sensor 15 is, for example, a LIDAR (Light Detection and Ranging) sensor which is known per se and which measures the distances d from the detected points of an object as well as the angles φ between the connecting straight lines to these points and the central longitudinal axis of the vehicle, as is illustrated in FIG. 1 by way of example for one point on the object 18. A reference point for the object 18 is determined from this and the speed of the detected object is directly or indirectly ascertained. When the environment sensor system comprises a radar sensor, the speed can be directly measured by means of the Doppler effect. One or more cameras or other environment sensors can also be used in principle.

The vehicle which is described by way of example can therefore use the environment sensor system to identify an imminent collision and initiate an emergency braking operation, in which vehicle the pump of the HCU preferably builds up such a high brake pressure in the wheel brakes that the brake slip control means intervenes. This has the advantage that the existing coefficient of friction between tires and the carriageway surface is optimally utilized and a short braking distance is achieved. The volumetric flow rate of the used pump limits the pressure build-up dynamics which can be achieved and therefore influences the braking distance which can be achieved since the earlier the coefficient of friction is optimally utilized, the shorter the braking distance.

Figure 2:
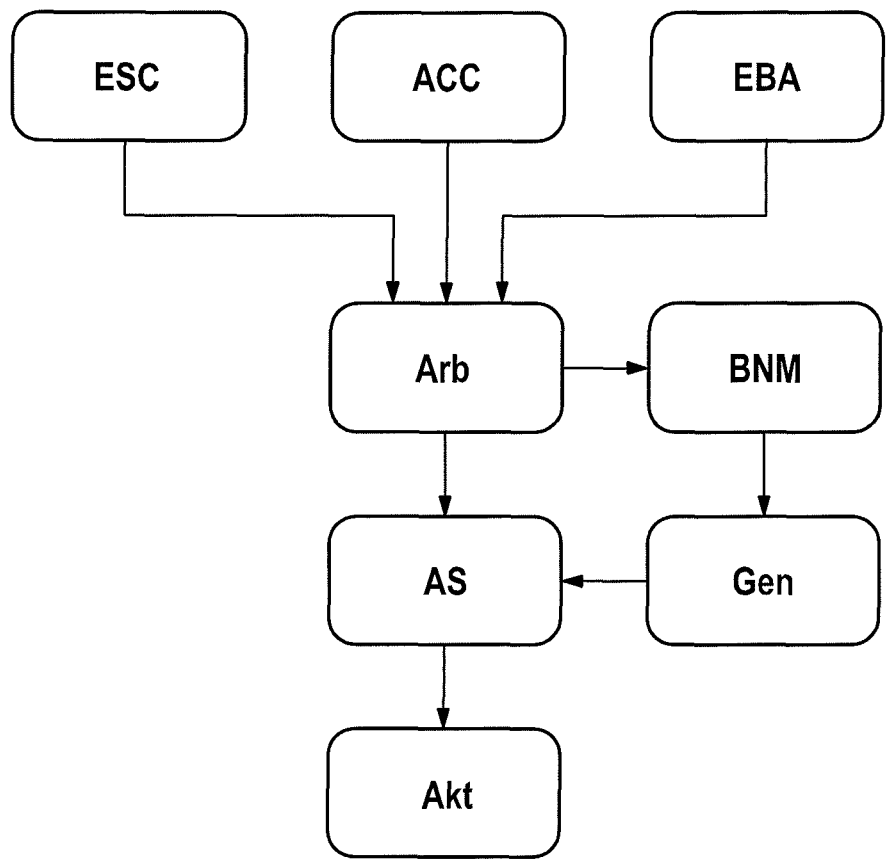
FIG. 2 shows a schematic illustration of a system for carrying out the method according to the invention.

FIG. 2 shows a schematic illustration of a system for carrying out the method according to the invention. In said figure, ESC denotes a driving dynamics control means, ACC denotes a distance control means, and EBA denotes an emergency brake assistant. These vehicle control means send a braking request to an arbitration unit Arb when their respective activation conditions are met, and said arbitration unit ascertains, on the basis of prespecified criteria, which braking request should be implemented by the brake system. The drive circuit AS which drives the actuator Akt and supplies said actuator with power is then activated.

In the exemplary embodiment shown, the arbitration unit Arb checks one or more prespecified conditions and sends a request to a management unit for the on-board electrical system BNM as soon as at least one of said conditions is met. The BNM then activates the generator Gen or operates it, possibly, at a higher power.

One or more of the vehicle control means, in particular the driving dynamics control means ESC, is/are implemented in the ECU 7 of a vehicle brake system. However, some vehicle control means can be provided by a special control device, such as a monitoring computer 16 for example, which carries out distance control ACC and/or an emergency brake assistant EBA.

The arbitration unit preferably checks, as a first prespecified condition, whether a braking request is made by an emergency brake assistant.

According to a preferred embodiment of the invention, as an alternative or in addition, a check is made, as a second prespecified condition, to determine whether a variable which characterizes the vehicle instability, in particular a deviation between the measured actual yaw rate of the vehicle and a setpoint yaw rate which is calculated on the basis of a vehicle model, exceeds a prespecified yaw rate difference threshold value. However, a variable which characterizes the vehicle instability can also be considered to be the slip of one or more wheels and/or the slip difference between various wheels.

According to a further preferred embodiment of the invention, as an alternative or in addition, a check is made, as a third prespecified condition, to determine whether the braking request exceeds a prespecified request threshold value. In this case, the pressure request made by a vehicle control system is, in particular, compared with a request threshold value. However, the pressure in a brake circuit of the brake system can also be considered to be a measure of the braking request when, for example, a pressure sensor is fitted to one or more wheel brakes. As an alternative or in addition, the longitudinal deceleration can also be compared with a request threshold value.

It is expedient when the condition/conditions for triggering an increase in the on-board electrical system voltage is/are checked by one or more separate control devices.

According to a preferred embodiment of the invention, the conditions are checked, as an alternative or in addition, by the ECU 7 or a function which is provided in the ECU 7, in particular the arbitration unit or a pressure controller for one or more wheel brakes.

The method according to the invention can also be carried out without an environment sensor system. Therefore, an emergency brake assistant can be implemented, for example, by the brake pressure p in the tandem master cylinder THZ being monitored, and a pressure being built up when the operating speed by the driver or the change dp/dt in the tandem master cylinder pressure with respect to time exceeds a prespecified limit value. A shorter braking distance and therefore increased driving safety can be achieved by raising the on-board electrical system voltage in this case too.

Figure 3:
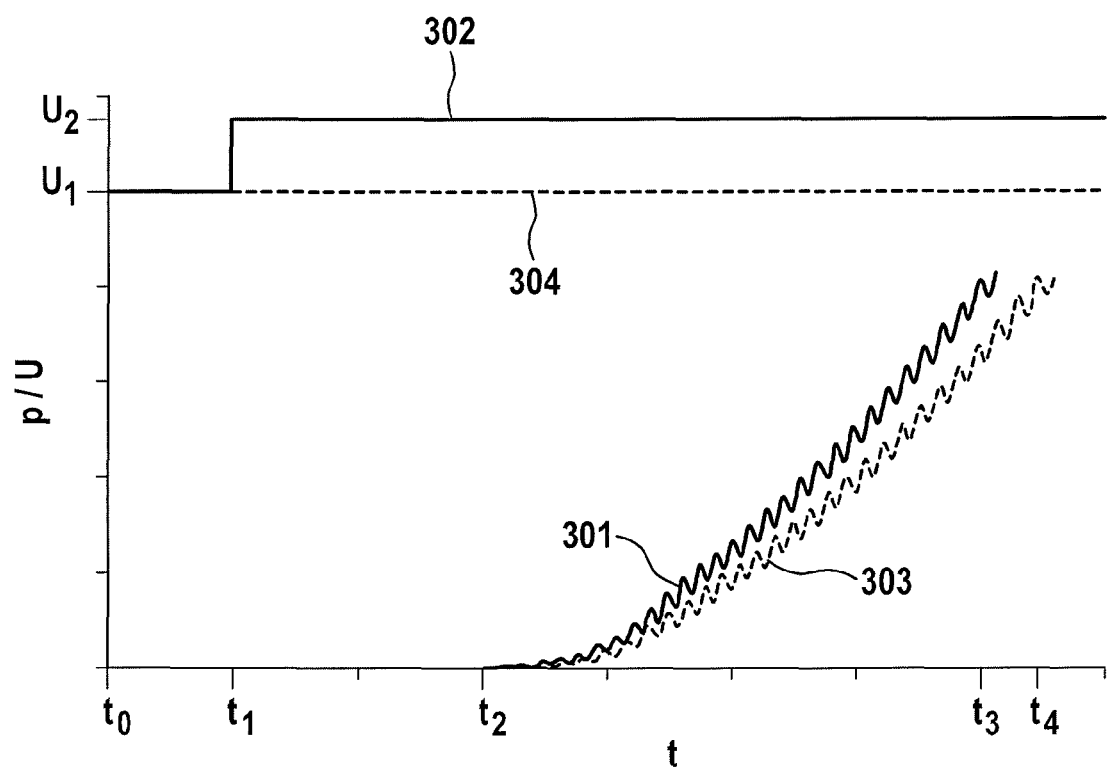
FIG. 3 shows the time profile of a braking operation.

FIG. 3 shows the time sequence of a braking operation, in which the build-up of a braking torque is requested by a vehicle control system and is implemented by activating a hydraulic pump. The pressure p in a brake circuit or a wheel brake of the brake system and the voltage U of the on-board electrical system are plotted on the ordinate, wherein line 301 indicates the pressure profile, and line 302 indicates the on-board electrical system voltage in accordance with the method according to the invention.

By way of example, a voltage $U_1$, which is also expedient (that is to say as low as possible) from an energy-saving point-of-view, is originally applied to the on-board electrical system.

At time $t_0$, a prespecified condition is met, after which an increase in the on-board electrical system voltage is requested. By way of example, the environment sensor system may establish that the distance from an obstacle falls below a warning threshold value of the emergency brake assistant.

The generator is then activated and, at time $t_1$, the on-board electrical system voltage is increased to the maximum permissible value $U_2$.

At time $t_2$, the distance from an obstacle falls below the intervention threshold value of the emergency brake assistant, after which a braking request is sent to the pressure controller and the hydraulic pump is activated. Said hydraulic pump is expediently fully driven and not operated in a clocked manner, in order to achieve the highest possible pressure build-up dynamics. Line 301 represents the pressure profile in a brake circuit, the pressure profile in the second brake circuit is corresponding.

The pressure which is built up is so high at time $t_3$ that the brake slip control means intervenes. Therefore, the existing coefficient of friction is optimally utilized, and a further build-up of pressure is no longer required.

When the vehicle has come to a stop and/or none of the prespecified conditions for raising the on-board electrical system voltage are met any longer, the voltage of the on-board electrical system can be reduced to the original value again (not shown).

Line 303 shows the pressure profile, and line 304 shows the on-board electrical system voltage according to the prior art.

No activity takes place until time $t_2$, at which the distance from an obstacle falls below the intervention threshold value of the emergency brake assistant. The on-board electrical system voltage remains at the constant value $U_1$ over the entire time.

Starting from time $t_2$, the pressure builds up in accordance with line 303. Since the pump motor runs at a lower voltage, the build-up in pressure is delayed in comparison to line 301.

Since the maximum possible pressure effect in accordance with the method according to the invention is achieved earlier, the braking distance is considerably reduced and the driving safety is increased.

The invention claimed is:

1. A method for braking a vehicle, including:
   raising a supply voltage of an on-board vehicle electrical system from a first voltage level to a second voltage level that is less than or equal to a maximum permissible value; and
   applying the supply voltage at the second voltage level to:
   1) at least one electrically operated actuator of a vehicle brake system in accordance with a braking request made by a vehicle control system when at least one pre-specified condition is met, such that braking torque is built up at one or more vehicle wheels independently of the driver, and
   2) at, least one other control device of the on-board vehicle electrical system, the at least one other control device including a microprocessor.

2. The method as claimed in claim 1, wherein a first prespecified condition is met when a braking request is made by a safety-critical vehicle control system.

3. The method as claimed in claim 2, wherein a second prespecified condition is met when a variable which characterizes the vehicle instability exceeds a prespecified yaw rate difference threshold value.

4. The method as claimed in claim 3, wherein a third prespecified condition is met when the braking request exceeds a prespecified request threshold value, wherein, the pressure request made by a vehicle control system or the pressure in a brake circuit of the brake system is considered to be a measure of the braking request.

5. The method as claimed in claim 2, a safety-critical vehicle control system is a driving dynamics control means or an emergency brake assistant.

6. The method as claimed in claim 3, wherein a variable which characterizes the vehicle instability is a deviation between the measured actual yaw rate of the vehicle and the setpoint yaw rate which is calculated on the basis of a vehicle model.

7. The method as claimed in claim 1, wherein the supply voltage of the on-board vehicle electrical system is raised to a prespecified value or a value which lies in a prespecified interval.

8. The method as claimed in claim 7, wherein at least one of the prespecified value and the prespecified interval is selected depending on which condition/conditions or how many of several prespecified conditions is/are met.

9. The method as claimed in claim 1, wherein the supply voltage is reset to the original value again as soon as none of the prespecified conditions are met any longer or a stationary state of the vehicle is identified.

10. The method as claimed in claim 9, wherein the supply voltage is reset to the original value again only after no braking request has been made by a vehicle control system for a prespecified period of time.

11. The method as claimed in claim 1, wherein the supply voltage of the on-board electrical system is raised above a voltage request in a management unit for the on-board electrical system.

12. The method as claimed in claim 1, wherein the at least one prespecified condition is met when a variable which characterizes the vehicle's instability exceeds a prespecified yaw rate difference threshold value.

13. The method as claimed in claim 1, wherein the at least one prespecified condition is met when the braking request exceeds a prespecified request threshold value, wherein the pressure request made by a vehicle control system or the pressure in a brake circuit of the brake system is considered to be a measure of the braking request.

14. A brake system for a vehicle, comprising:
  at least one electrically operated actuator which allows braking torque to be built up at one or more vehicle wheels independently of the driver, and
  a control device which drives at least one electrically operated actuator using a method in which at least one electrically operated actuator of a vehicle brake system is driven in accordance with a braking request made by a vehicle control system,
  wherein the control device is configured to:
    raise a supply voltage of an on-board vehicle electrical system from a first voltage level to a second voltage level that is less than or equal to a maximum permissible value,
    apply the supply voltage at the second voltage level to the at least one electrically operated actuator when at least one prespecified condition is met, such that braking torque is built up at one or more vehicle wheels independently of the driver, and
    apply the supply voltage at the second voltage level to at least one other control device of the on-board vehicle electrical system, the at least one other control device including a microprocessor.

15. The brake system as claimed in claim 14, wherein at least one of the electrically operated actuators is a pressure medium pump.

16. The brake system as claimed in claim 15, wherein the pressure medium pump is a piston pump.

17. The brake system as claimed in claim 14, wherein at least one of the electrically operated actuators is an electromechanically operated friction brake.

18. The brake system as claimed in claim 14, wherein the control device is connected to one or more environment sensors and/or a monitoring computer, for evaluating environment sensor systems, by a vehicle data bus or one or more control lines.

19. A motor vehicle driven by an internal combustion engine and/or at least one electric motor, comprising:
  a brake system including:
    at least one electrically operated actuator, and
    a control device which drives the at least one electrically operated actuator, the control device is configured to:
      raise a supply voltage of an on-board vehicle electrical system from a first voltage level to a second voltage level that is less than or equal to a maximum permissible value,
      apply the supply voltage at the second voltage level to the at least one electrically operated actuator when at least one prespecified condition is met, such that braking torque is built up at one or more vehicle wheels independently of the driver, and
      apply the supply voltage at the second voltage level to at least one other control device of the on-board vehicle electrical system, the at least one other control device including a microprocessor.

* * * * *